UNITED STATES PATENT OFFICE.

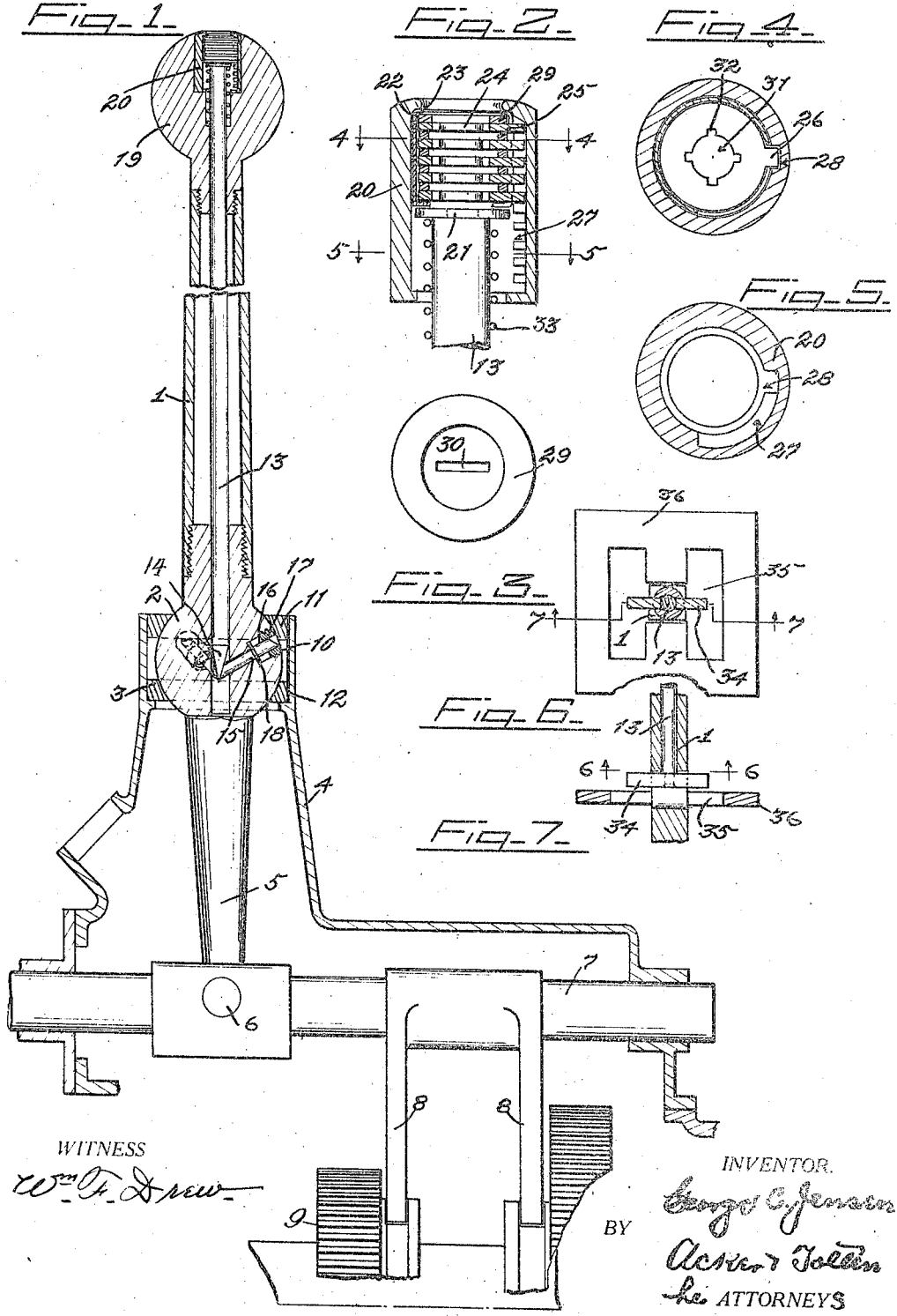

GEORGE C. JENSEN, OF OAKLAND, CALIFORNIA.

LOCK MECHANISM FOR AUTOMOBILES.

1,221,993.  Specification of Letters Patent.  Patented Apr. 10, 1917.

Application filed September 21, 1916. Serial No. 121,381.

*To all whom it may concern:*

Be it known that I, GEORGE C. JENSEN, a citizen of the United States, residing at Oakland, in the county of Alameda and State of California, have invented certain new and useful Improvements in Lock Mechanism for Automobiles, of which the following is a specification.

The present invention relates to a locking mechanism for movable levers, and is particularly adapted for application to the control levers of a motor vehicle.

The object of the invention is to provide a simple and practical device of the type described, which may be easily installed upon the control levers, and particularly upon the gear shifting lever of a motor vehicle, by means of which such levers or lever may be securely locked against movement by unauthorized persons.

When the device, constituting the invention, is installed upon the gear shifting lever of a motor vehicle, said lever may be locked in its neutral position, thereby preventing the engagement of any of the driving gears of the vehicle. The vehicle may then be moved for short distances by hand, as, for example, when it is desired to move said vehicle from place to place in a garage or repair shop. At the same time the vehicle is securely locked against movement under its own power, and therefore cannot be tampered with by unauthorized persons.

Although the preferred form of the invention is hereinafter described and herewith illustrated as particularly applicable to the gear shifting lever of a motor vehicle, it is to be understood that the use of the device is not so restricted, but, on the contrary, the invention may be applied to any of the control levers of such a vehicle, or to any movable lever for the locking thereof.

In order to comprehend the invention, reference should be had to the accompanying drawing, wherein—

Figure 1 is a sectional elevation through a motor vehicle gear shifting lever having my locking mechanism applied thereto.

Fig. 2 is a vertical section, enlarged, of the lock member of my device.

Fig. 3 is a plan view of the upper portion of the lock member.

Fig. 4 is a transverse section taken in the direction of the arrows on the line 4—4 of Fig. 2.

Fig. 5 is a transverse section taken in the direction of the arrows on the line 5—5 of Fig. 2.

Fig. 6 is a sectional plan, showing a modified form of my device as adapted for a lever working within a guide slot, taken in the direction of the arrows on the line 6—6 of Fig. 7.

Fig. 7 is a vertical section of the same, taken in the direction of the arrows on the line 7—7 of Fig. 1.

In the drawings, the reference numeral 1 designates a lever, herein shown as a gear shifting lever of the type commonly employed upon motor vehicles having variable speed power transmitting mechanism. As is customary, the lever 1 is formed at its fulcrum point with a substantially spherical portion 2 adapted to be retained within a socket 3 carried by the upper portion of the gear case 4. The lever 1 may be connected with the variable speed mechanism in any desired manner, as, for example, in Fig. 1 of the drawings, wherein I have illustrated a conventional form of such connection, in which the lower end 5 of the lever 1 extends below the spherical fulcrum portion 2 and is pivotally connected at 6 with a sliding shifter rod 7, the latter carrying shifting forks 8 adapted for engagement with the movable gears 9 for the shifting thereof.

The socket 3, within which the spherical portion 2 of the lever 1 is seated, is formed with a horizontal annular groove 10. For convenience of construction, said socket 3 may be formed as shown in Fig. 1 of the drawings with upper and lower plates 11 and 12 respectively, said plates having spherically formed apertures for the reception of the spherical portion 2 of the lever, and being spaced apart to form the horizontal annular groove 10 between them.

The lever 1 is hollow and contains a longitudinally disposed rod 13 having limited sliding movement within said hollow lever. The lower end of said rod 13 lies within the spherical portion 2 of the lever and is tapered as shown at 14. Said spherical portion 2 is drilled with a plurality of inclined orifices 15, said orifices being radially disposed and extending from the central portion of the spherical fulcrum portion 2 to the exterior surface thereof. In the preferred form illustrated in the drawings, three of said orifices 15 are provided in the spherical portion 2 of the lever, although any number thereof may be employed.

Within each of said inclined orifices 15 is a freely slidable locking pin 16, having its inner and lower end inclined and adapted for engagement by the tapered lower end 14 of the longitudinal sliding rod 13. The outer ends of said locking pins 16 preferably slide within guides 17 screwed into the orifices 15, and normally lie flush with or slightly below the surface of the spherical portion 2 of the lever in a plane immediately below the upper edge of the groove 10 in the spherical socket 3. Thus it will readily be seen that a downward movement of the central rod 13 when the lever 1 is in its central, or neutral position will force the locking pins 16 outwardly and upwardly to cause their outer ends to project beyond the surface of the spherical portion 2 of the lever and to engage the upper edge of the groove 10, and by so doing to prevent movement of the lever 1 in any plane within its socket 3. Said locking pins 16 are preferably provided with collars 18 to limit the movement thereof, as shown in Fig. 1.

Within the upper end or handle portion 19 of the lever 1 is a lock member for retaining the central sliding rod 13 in its lower or locking position. Said lock member comprises a stationary cylindrical sleeve 20 (Figs. 1 and 2) mounted in the handle portion 19 and into which the upper end of the sliding rod 13 extends. The upper end of said sliding rod is formed with an abutment collar 21 upon which rests a cylindrical shell 22, positioned concentrically within the sleeve 20 for both rotary and vertical sliding movement, and having its upper and lower ends curled inwardly, as shown at 23. Within said shell 22 is a series of horizontal superposed disks 24 spaced apart by washers 25. Each disk 24 is provided with a radially extending lug 26 (Fig. 4) which passes through a horizontally disposed slot in the cylindrical shell 22 and lies within an arcuate horizontal groove 27 formed in the inner surface of the outer sleeve 20. As will be seen from Fig. 5 of the drawings, these arcuate grooves permit the disks 24 to have rotary movement within the sleeve 20 for approximately 90 degrees.

At one end of the arcuate groove 27, in the sleeve 20, is formed a vertical groove 28, within which the lugs 26 of the disks 24 may have vertical movement. Thus when said lugs lie within said vertical groove 28, the entire series of disks 24, contained within the shell 22, may be moved vertically within the sleeve 20. When depressed said disks 24 can be rotated to carry the lugs 26 into their respective arcuate slots 27, thereby retaining said disks and the shell 22 in their lowermost vertical position. Inasmuch as said shell 22 rests upon the upper end of the sliding rod 13, downward movement of said shell 22 depresses said rod, thereby causing the locking of the lever 1 by the means hereinbefore described, and the turning of the disks 24 retains said rod in its locking or operative position.

Above the uppermost disk 24 and within the sliding shell 22 is a plate 29 (Figs. 2 and 3) having a suitably formed key slot 30 therein. Each of the disks 24 is preferably formed, as shown in Fig. 4 of the drawings, with a central circular aperture 31 and four radially disposed notches 32. By the insertion of a suitably formed key, not shown in the drawings, one or more of the disks 24 may be rotated, to lock the shell 22 against vertical movement. As will readily be understood, after the device has been locked by the rotation of one or more of the disks 24, it may be unlocked only by a key identical in form with the original locking key. A spring 33 (Figs. 1 and 2) is interposed below the upper abutment collar 21 of the central sliding rod 13 to restore said rod to its upper position upon the release of the lock mechanism, the locking pins 15 being restored to their normal or free position by gravity.

The lock mechanism previously described for retaining the central sliding rod 13 in its lower or operative position, is a form which is preferred for this purpose. It is to be understood, however, that the invention is not limited to the lock mechanism described, but any suitable form of lock member may be employed for retaining the sliding rod in its operative position.

The invention as hereinbefore described is equally applicable to a lever moving within a slotted guide member, as shown in Figs. 6 and 7 of the drawings. In this form of the invention, the lower end of the central sliding rod 13 carries a transversely disposed latch member 34 which, when depressed by the downward movement of said sliding rod 13, lies within the slot 35 of the stationary guide member 36 and prevents movement of the lever 1.

Having thus described my invention, what I claim as new and desire to protect by Letters Patent is:—

1. In combination with a lever having a stationary fulcrum member, a longitudinally disposed member within said lever adapted for manual lineal movement to operative position and for automatic lineal movement in a reverse direction to inoperative position, devices associated with the lower end of said lineally movable member and adapted to be moved transversely of the lever into operative position by the movement of said member into operative position, said devices when in operative position projecting beyond said lever and engaging directly with said stationary fulcrum member to prevent movement of said lever, lock controlled means for retaining said lineally movable member in operative position, and means for automatically returning the same to operative position on the release of said locking means.

2. In combination with a movable lever having a stationary fulcrum member, a longitudinally disposed member having lineal sliding movement within said lever, devices movable transversely of said lever and associated with the lower end of said lineally movable member and adapted to be actuated by the movement thereof to project beyond the same and to engage directly with said stationary fulcrum member to prevent movement of said lever, said fulcrum member concealing the projecting portions of said devices, lock controlled means for retaining said lineally movable member in operative position and means for restoring said lineally movable member to normal position on the release of said locking means.

3. In combination with a movable lever and an associated stationary member, a longitudinally disposed rod positioned within said lever and adapted for lineal movement therein, said rod carrying an inclined face, a transversely movable member positioned within said lever and having its inner end positioned for engagement by the inclined face of said lineally movable rod, means carried by the stationary member associated with said lever for engagement by the outer end of said transversely movable member, and lock controlled means for retaining said lineally movable rod in operative position.

4. In combination with a movable lever fulcrumed for universal swinging movement within a substantially spherical socket, a longitudinally disposed rod carried within said lever and adapted for lineal movement therein, said rod having a tapered lower end, a transversely movable pin carried within said lever in the region of the fulcrum thereof, said pin having its inner end abutting against the tapered lower end of said lineally movable rod, and having its outer end adapted for projection beyond the surface of said lever for engagement with said socket member to prevent movement of said lever, and lock controlled means for retaining said lineally movable rod in operative position.

5. In combination with a lever provided with a substantially spherical portion fulcrumed for universal swinging movement within a substantially spherical socket formed of two members one of which is in the form of a removable ring, locking devices carried within said spherical portion of said lever and adapted for movement laterally thereof into operative position to project beyond the surface of said spherical portion at a point beneath the under surface of said removable ring to engage directly with the socket member to lock said lever against all operative movement relatively thereto, and lock controlled means for retaining said locking devices in operative position.

6. In combination with a lever fulcrumed upon a stationary member for swinging movement in two vertical planes perpendicular to each other, laterally slidable locking devices movable transversely of said lever and for projecting beyond the same when in operative position for engagement directly with said stationary member for preventing operative movement of said lever relative thereto, and lock controlled means for retaining said locking devices in operative position, said locking devices and lock controlled means being concealed within said lever and stationary member at all times.

In testimony whereof I have signed my name to this specification in the presence of two subscribing witnesses.

GEORGE C. JENSEN.

Witnesses:
N. A. ACKER,
D. B. RICHARDS.